United States Patent [19]
Gooch et al.

[11] 3,993,460
[45] Nov. 23, 1976

[54] DUST CONTROL SYSTEM

[75] Inventors: Jan W. Gooch; Aloysius J. Wrape, both of Little Rock, Ark.

[73] Assignee: Chlortrol Inc., Little Rock, Ark.

[22] Filed: July 18, 1975

[21] Appl. No.: 597,131

[52] U.S. Cl. .................................. 55/92; 55/238; 55/263; 55/270; 55/DIG. 34; 55/227; 261/79 A; 73/28
[51] Int. Cl.² ........................................ B01D 47/06
[58] Field of Search .............. 55/5, 18, 83, 84, 92, 55/94, 225, 227, 237, 238, 257 C, 270, 274, 275, 210, DIG. 34, 263; 261/79 A; 73/28; 116/114 F, 114 N; 222/72

[56] References Cited
UNITED STATES PATENTS

| | | | |
|---|---|---|---|
| 710,605 | 10/1902 | Osborne | 55/263 |
| 968,456 | 8/1910 | Edwards | 261/79 A |
| 1,563,125 | 11/1925 | Ward | 55/83 |
| 1,792,590 | 2/1931 | Kirk | 55/225 |
| 2,076,553 | 4/1937 | Drinker et al. | 73/28 |
| 2,684,008 | 7/1954 | Vonnegut | 73/28 |
| 3,131,237 | 4/1964 | Collins, Jr. | 55/263 |
| 3,163,173 | 12/1964 | Kuntz | 55/18 |
| 3,912,469 | 10/1975 | Ewan et al. | 55/263 |

FOREIGN PATENTS OR APPLICATIONS 1,253,489  11/1967  Germany .............................. 73/28

*Primary Examiner*—Frank W. Lutter
*Assistant Examiner*—David L. Lacey
*Attorney, Agent, or Firm*—Jones, Thomas & Askew

[57] ABSTRACT

A particulate laden air or gas stream is moved by a blower through a duct to a centrifugal separator and fluid is injected into the air stream. The particles in the air stream become heavier from the injected fluid so that they will be separated more efficiently from the air in the centrifugal separator. A monitor detects the quantity of particulate in the air stream and a control system varies the quantity of fluid injected into the air stream in response to a change in the quantity of particulate in the air stream.

18 Claims, 3 Drawing Figures

U.S. Patent  Nov. 23, 1976  3,993,460 ced by a new,
DUST CONTROL SYSTEM

BACKGROUND OF THE INVENTION

The control of disposable airborne waste such as wood dust and other airborne waste having fine particulate in its make-up from industrial sites has been accomplished in the past usually by moving exhaust air through filter means such as cloth tube filters and wet collectors and by centrifugal separation of the particulate from exhaust air. The filter system for dust collection is an effective method for dust collection, but by comparison to other methods the typical filtration system is very expensive to construct, and in the operation of a filtration system increased static pressure losses of the exhaust air occur and therefore increased fan horsepower is required to force the exhaust air through the filter media, resulting in more expensive power requirements to operate the system. The conventional centrifugal separation systems are not as effective as filter systems but they are much less expensive to construct and to maintain. While the centrifugal separators are less expensive to purchase and to operate, some pollution standards are not met by many of the conventional centrifugal separators. If the centrifugal separator in an operating plant must be replaced by a new, more efficient centrifugal separator or by a filtration system to meet the pollution standards, the fan, ductwork, supports and other elements supporting the old separator usually must be replaced and the owner of the plant may be faced with substantial equipment purchase costs and installment costs, as well as temporary plant shutdown.

While the prior art has suggested injecting fluid into a particulate laden air stream to improve the collection efficiency of a centrifugal separator, the fluid injection was not precisely controlled so that an improper amount of fluid could be injected into the gas stream. Too little fluid results in poor collection efficiency, and excessive fluid results in the particles becoming excessively moisture laden and wet. The resulting waste product is difficult to handle in further processing and in disposal. For example, in the field of wood waste, excessive moisture tends to cause plugging in the cyclone separator, to cause difficulty in physically handling its disposal, and when combustible waste is used as boiler fuel, excessive moisture causes inefficient combustion and other operation problems in some boiler designs.

The recycling of waste has become more prevalent and waste is transported long distances for subsequent processing in other products. Any increase in moisture content results in increased weight and increased freight costs, and such increased moisture content in many cases can result in the waste product being unusable or difficult to use.

SUMMARY OF THE INVENTION

Briefly described, the present invention comprises an improved system for treating a particulate laden air or gas stream that is compatible with many existing conventional centrifugal air particle separators and may not require replacement of a conventional separator in an existing system. A fan moves the particulate laden air stream to a centrifugal separator and a monitor functions to detect the particulate moving in the air stream. A fluid injection system injects steam or other fluid or liquid vapor into the air stream and the volume of fluid injected into the stream is varied in accordance with the variation of the quantity of the particulate moving in the air stream as detected by the monitor. A conventional centrifugal air particle separator can be utilized in the system, and if an existing system is being modified to increase its effectiveness, it is usually not necessary to replace the conventional centrifugal separator, its fan, ductwork, motor and supporting elements in order to install the improved system since these existing components become a part of the improved system. The particles moving in the air stream adsorb the atomized fluid or fluid vapor injected into the air stream which results in particles becoming heavier and more subject to centrifugal forces in the centrifugal separator. The weight added to the particles causes the smaller particles that would have moved with the air stream to the atmosphere to be separated from the air stream in the centrifugal separator. The amount of fluid injected into the air stream is carefully controlled so that the moisture content of the air stream is not so great that the particles become so wet that they tend to accumulate in the ductwork, centrifugal separator or on any of the surfaces of the equipment.

Thus, it is an object of the present invention to provide an improved system of treating a particulate laden air stream so as to improve the particulate collection efficiency of a centrifugal separator before the air stream is exhausted, with the system being relatively inexpensive to construct and to operate, expedient to install, and effective to extract both large and small particles moving in the air stream.

Other objects, features and advantages of the present invention will become apparent upon reading the following specification, when taken in conjunction with the accompanying drawing.

DETAILED DESCRIPTION OF THE EMBODIMENTS

Figure 1:
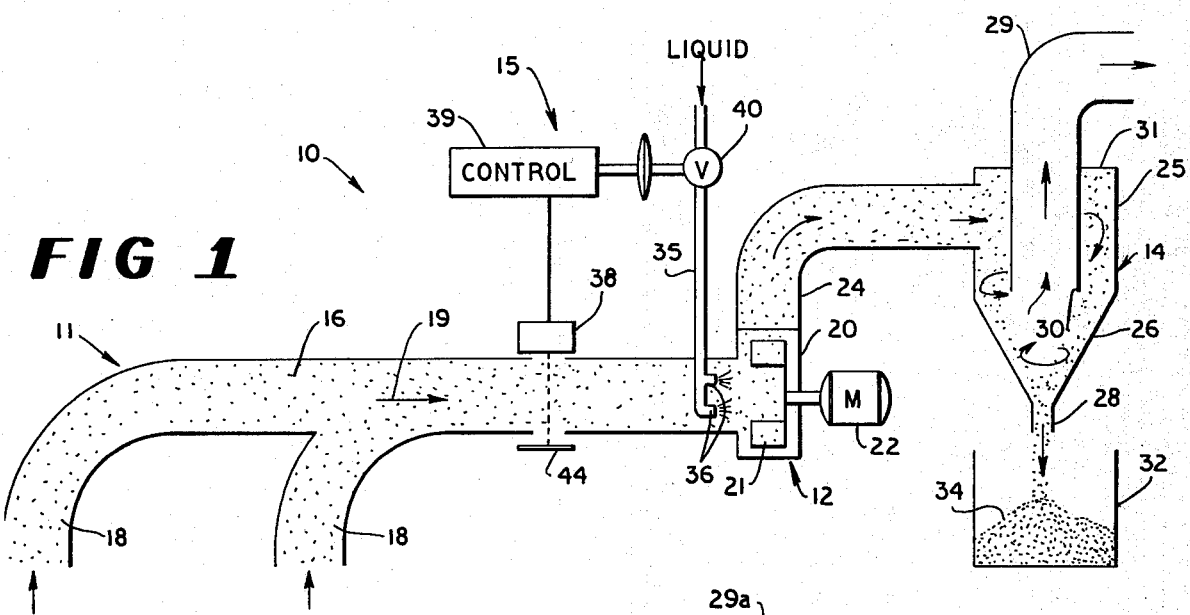
FIG. 1 is a schematic illustration of the air particle separator system, illustrating the monitor positioned on the upstream side of the system.

Referring now in more detail to the drawing, in which like numerals indicate like parts throughout the several views, FIG. 1 illustrates an air particle separator 10 which includes a duct system 11, fan 12, centrifugal separator 14 and fluid control and injection system 15. The duct system 11 receives a particulate laden air stream 16 from a single or multiple number of sources 18, and fan 12 moves the particulate laden air in the direction indicated by arrow 19 through the duct system. Fan 12 disclosed in this embodiment of the invention is a centrifugal blower and includes housing 20, impeller 21 and motor 22. The blower includes a tangential exhaust branch 24 that carries the particulate laden air stream from the blower housing 20 to the centrifugal separator 14.

The centrifugal separator 14 illustrated herein is a cyclone separator and includes upper cylindrical section 25, lower conical section 26, bottom particulate discharge port 28 and upper air exhaust duct 29. The lower entrance end 30 of the air exhaust duct 29 extends downwardly from the top wall 31 of the cylindrical section 25 into the central portion of the separator, and the tangential exhaust branch 24 extending from fan 12 enters the upper cylindrical section 25 of the separator horizontally at an off-centered position, so that the air stream tends to flow in a spiral path about the lower portion of the gas exhaust duct 29, causing substantial cylindrical forces to be exerted on the air stream and its particles. The heavier particles in the air stream tend to be projected outwardly in the centrifugal separator and eventually moved in a downward direction by air flow and by gravity through the lower conical section 26 and eventually out of the bottom particulate discharge port 28, while the exhaust air is forced from the separator in an upward direction through the upper gas exhaust duct 29 and to the atmosphere or to another location. A collection container 32 receives the particles 34 from the centrifugal separator 14, or the waste collected may be further transported by other means to other locations.

Fluid control and injection system 15 includes a conduit 35 in communication at one of its ends with a source of fluid under pressure and extends at its other end into the air duct system 11 and terminates in one or more nozzles 36. Examples of typical "fluids" injected into the particulate laden air stream are atomized water or steam which can be chemically treated to facilitate atomization. The term "fluid" is used generically to designate a fluid which includes a substantial amount of moisture. The fluid is supplied under pressure so that the nozzles 36 function to inject and diffuse the fluid into the air stream. Opacity monitor 38 functions as a particulate monitor and is connected to the air duct system 11. Control system 39 functions in response to the opacity monitor 38, and fluid flow control valve 40 is positioned in the fluid conduit 35 and responds to the control system 39 to control the flow of pressurized fluid through the fluid conduit 35 to the nozzle 36.

Figure 3:
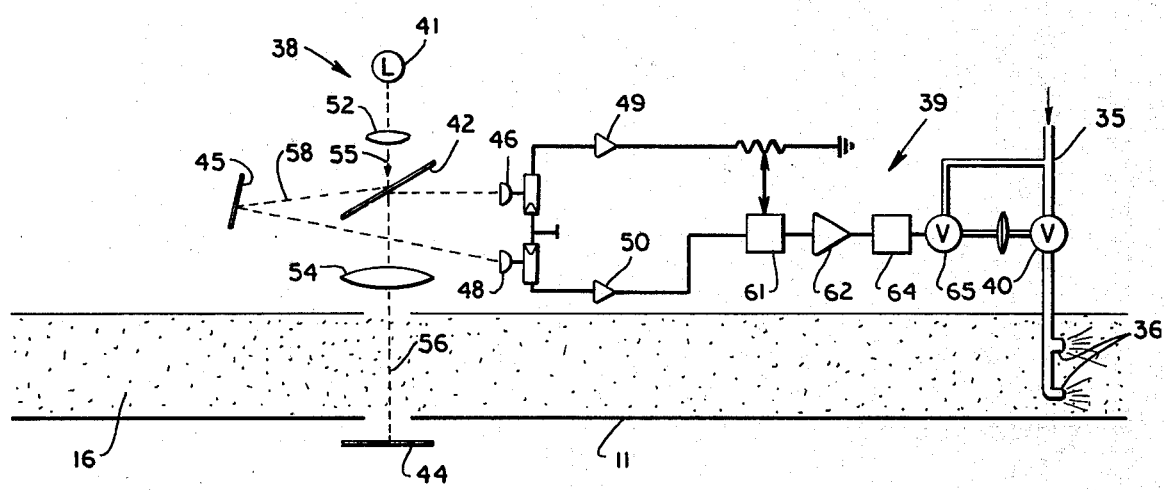
FIG. 3 illustrates the fluid control and injection system for the air particle separator system of FIG. 1.

As is illustrated in FIG. 3, the opacity monitor 38 includes an incandescent light 41 as a single light source, a beam splitter 42, a measurement reflector 44, a comparison reflector 45, a measurement photocell detector 46, a reference photocell detector 48, amplifiers 49 and 50, and a divider 61. The light from the light source 41 is focused by the lenses 52 and 54, with the beam 55 from the lens 52 being split into a measurement beam 56 and a reference beam 58. The measurement beam passes through the beam splitter 42, through focusing lens 54, through the paticulate laden air stream 16, is reflected by the measurement reflector 44 back through the air stream, and is reflected by beam splitter 42 to the measurement photocell detector 46. Beam splitter 42 also reflects reference beam 58 to the comparison reflector 45, which directs the reference beam to reference photocell detector 48. The light beam traversing the air duct system of the air stream is reflected back across the same path and the reflected beam is compared with the reference beam, and the difference between the intensities of the two beams represents the opacity of the air stream or the approximate quantity of the particles moving in the air stream through the duct system. A change in the difference between the intensities of the two beams represents a change in the opacity of the air stream or a change in the approximate quantity of the moving particles. The light beam encounters particles in the air stream during the first and the second passes of the light beam across the air stream and produces a proportional signal which corresponds to the opacity of the air stream. The signal from the opacity monitor is used to regulate the liquid injected into the air stream. The measurement photocell detector and the reference photocell detector are carefully matched so that if there is no reduction in the intensity of the measurement beam 56, the photocell detectors will emit identical signals. Thus, the light source 41 functions as a given source of light for both the measurement photocell detector and the reference cell detector, and the opacity of the particulate laden air stream, which is considered functionally as the quantity of particles in the air stream, causes a reduction in the intensity of the measurement light beam received at the measurement photocell detector 46. The signals from the photocell detectors are amplified and applied to the divider 61 which computes the quotient of the two signals. Thus, the opacity monitor 38 functions as a means for detecting the opacity of the air stream or the approximate quantity of the particles moving in the air stream 16, and the signal provided by the divider circuit 61 is transmitted to the control system 39. An example of opacity monitors of the type suitable for this type of sensing in the duct is the RM 7 Opacity Monitor available from Lear Siegler, Inc. of Englewood, Col.

It is desirable to position the light source 41 and measurement reflector 44 so that the measurement beam 56 passes through the air stream at a turbulent portion of the air stream where a good sample of the particles are likely to be distributed in the air stream, to provide an accurate reading of the quantity of particles in the air stream.

The control system 39 includes amplifier 62, valve controller 64, control valve 65 and fluid flow control valve 40 which is a diaphragm valve. Amplifier 62 amplifies the signal received from divider 61 of opacity monitor 38 and transmits the signal to valve controller 64, and valve controller 64 regulates the control valve 65. Control valve 65 communicates with the high pressure conduit 35 and modulates diaphragm chamber of diaphragm valve 40 with high pressure at a ratio corresponding to the input from valve controller 64. The diaphragm liquid flow control valve 40 functions to regulate the liquid moving through the liquid conduit 35 to the nozzle 36 positioned in the particulate laden air flow 16 inside conduit system 11.

Figure 2:
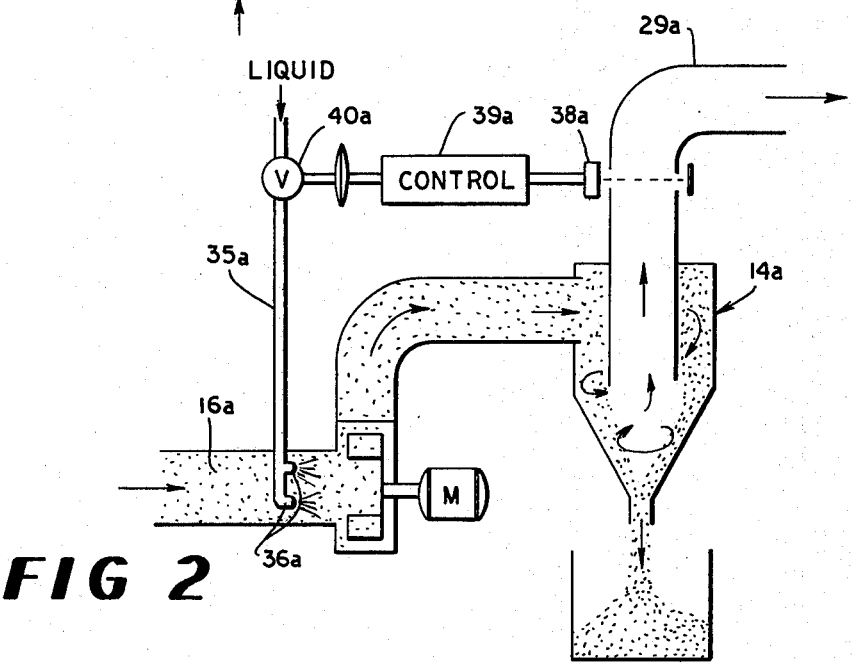
FIG. 2 is a schematic illustration of the air particle separator, showing an alternate embodiment of the invention where the monitor is located at the exhaust of the centrifugal separator.

As is illustrated in FIG. 2, wherein another embodiment of the invention is illustrated, the opacity of the air flow is detected at the upper air exhaust duct of the centrifugal separator. For example, the opacity monitor 38a is positioned so as to sight across the upper air exhaust duct 29a of the centrifugal separator 14a, and the signal generated by the opacity monitor 38a is transmitted to control system 39a which in turn controls fluid flow control valve 40a to regulate the fluid moving through fluid conduit 35a to the nozzle 36a in the particulate laden air stream 16a.

In both embodiments illustrated, the particulate in the air stream adsorbs the moisture from the fluid injected into the air stream. Since the ratio of the surface area to mass of a particle increases with decreasing particle size, the smaller particles which usually escape a conventional centrifugal separator are the very particles that are more apt to become much heavier by the adsorption of moisture. The finer, smaller particles have a tendency to adsorb the greater proportion of the fluid injected into the air stream as compared with the larger particles which radically increases the weight of the smaller particles. The small particles with adsorption of fluid also tend to agglomorate with other small and larger particles resulting in even heavier particles. The now heavier particles are much more likely to be separated in centrifugal separator 14 and extracted from the air stream before the air stream is exhausted. Much of the injected fluid becomes vapor which does not adhere to dust particles in the air stream and is exhausted with the air stream.

There are two basic methods for proportioning the fluid injected into the air stream. The two methods are "direct proportioning" of the fluid to the quantity of particulate and "indirect proportioning" of the fluid to the quantity of vapor exhaust.

As illustrated in FIG. 1, the direct proportioning of the fluid consists of detecting the particulate in the air stream in the duct upstream of the cyclone separator and injecting atomized liquid or steam in proportion to the particle quantity detected. Direct proportioning can also be used in the embodiment illustrated in FIG. 2, by detecting the particulate quantity in the air stream at the exhaust as long as the fluid utilized does not result in excessive vapor emission to which the monitor responds. In general terms, this method of control is: increased fluid injection with a corresponding increase in particle quantity in the air stream at the detection point.

The second method of proportioning the fluid is indirect proportioning, or detecting an excess of steam or water vapor and decreasing the fluid injection in the air stream until the detected steam or vapor of the exhaust of the air stream from the centrifugal separator is substantially zero. The embodiment of the invention illustrated in FIG. 2 is utilized in an indirect proportioning system. The indirect proportioning method does not require detection of particulate for regulating the fluid injected into the air stream, and the system is controlled in response to vapor quantity appearing from an increase in the fogging at the exhaust from the centrifugal separator. This method necessitates an additional amount of fluid to be injected into the air stream to achieve vapor detection at the exhaust of the centrifugal separator and then allowing the monitor to detect the vapor and progressively decrease the liquid injection until the vapor quantity at the exhaust of the separator is substantially zero. This method usually uses steam as the injected fluid.

When the direct proportioning of fluid to particle quantity is used, it is desirable to position the monitor and the fluid injection nozzles in the duct system, with the spray nozzles being located downstream from the monitor so that there is a relatively short lag time between the point of detection and the point of injection of fluid. FIG. 1 illustrates direct proportioning of fluid injection to particle quantity with the detection taking place in the duct system upstream of the fan 12. FIG. 2 illustrates a system arrangement where both indirect proportioning of fluid injection to steam vapor opacity and direct proportion of fluid injection to particle quantity can be accomplished, with the monitor 38a located at the upper air exhaust duct 29a.

Although the invention has been disclosed as using a folded beam opacity monitor as the particulate quantity sensing means, it will be understood by those skilled in the art that other sensing means such as a single pass opacity monitor, mass monitoring by radio active means, and mass monitoring by microwave means can be utilized in the system to provide the same or similar results. Moreover, while a particular control system has been specifically disclosed, other types of systems, including electrical, pneumatic, or electro pneumatic control systems can be utilized, if desired.

While this invention has been described in detail with particular reference to preferred embodiments thereof, it will be understood that variations and modifications can be effected within the spirit and scope of the invention as described hereinbefore and as defined in the appended claims.

We claim:

1. In a process of treating an air stream to remove particulate from the air stream wherein an air stream is moved by fan means to a centrifugal separator and fluid including a substantial amount of moisture is injected into the air stream prior to its entering the separator to contact the particles and make the particles heavier so that the particles will be separated from the air stream in the centrifugal separator, the improvement therein comprising the steps of detecting the opacity of the air stream and proportioning the quantity of fluid injected into the air stream in response to the opacity of the air stream.

2. The process of claim 1 and wherein the step of detecting the opacity of the air stream comprises directing a beam of light from a given source of light across the air stream and comparing the intensity of the beam of light passed through the air stream with the intensity of a similar beam of light from the same source of light and wherein the step of controlling the quantity of fluid injected into the air stream in response to the opacity of the air stream comprises increasing the quantity of fluid injected into the air stream in response to the detection of a decrease in the intensity of the beam of light directed across the air stream.

3. The process of claim 1 and wherein the step of detecting the opacity of the air stream comprises detecting the particles in the air stream prior to the position where fluid is injected into the air stream.

4. The process of claim 1 and wherein the step of detecting the opacity of the air stream comprises detecting the particles at the exhaust of the air stream from the centrifugal separator.

5. The process of claim 1 and wherein the step of detecting the opacity of the air stream comprises directing a beam of light from a given source through the air stream and reflecting the light beam back through the air stream and comparing the intensity of the beam of light directed through and reflected through the air stream with the intensity of a similar beam of light from the same source.

6. The process of claim 1 and wherein the step of controlling the quantity of fluid injected into the air stream in response to the opacity of the air stream comprises decreasing the quantity of fluid injected into the air stream in response to a decrease in the opacity of the air stream.

7. The process of claim 1 and wherein the step of detecting the opacity of the air stream comprises directing a beam of light from a given source through the air stream at the exit of the air stream from the centrifugal separator and comparing the intensity of the beam of light directed through the air stream with the intensity of a similar beam of light from the same source, and wherein the step of controlling the quantity of fluid injected into the air stream in response to the opacity of the air stream comprises injecting an excessive quantity of fluid into the air stream to reduce the intensity of the beam of light directed through the air stream and subsequently reducing the quantity of fluid injected into the air stream.

8. The process of claim 1 and wherein the step of detecting the opacity of the air stream comprises detecting the particles in the air stream at a turbulent portion of the air stream, and injecting the fluid into said turbulent portion of the air stream.

9. The process of claim 1 and wherein the fluid injected into the air stream is steam.

10. In a process of treating an air stream to remove particulate from the air stream wherein an air stream is moved by fan means to a centrifugal separator and fluid including substantial amount of moisture is injected into the air stream prior to its entering the separator to contact the particles and make the particles heavier so that the particles will be separated from the air stream in the centrifugal separator, the improvement therein comprising the steps of detecting the quantity of particles moving in the air stream and proportioning the quantity of fluid injected into the air stream in response to a change in the quantity of particles moving in the air stream.

11. The process of claim 10 and wherein the step of detecting the quantity of particles moving in the air stream comprises detecting the particles in the air stream upstream from the position where fluid is injected into the air stream.

12. The process of claim 10 and wherein the step of detecting the quantity of particles moving in the air stream comprises detecting the particles at the exhaust of the air stream from the centrifugal separator.

13. The process of claim 10 and wherein the step of controlling the quantity of fluid injected into the air stream in response to a change in the quantity of particles moving in the air stream comprises decreasing the quantity of fluid injected into the air stream in response to a decrease in the quantity of particles moving in the air stream.

14. The process of claim 10 and wherein the fluid injected into the air stream is steam.

15. Apparatus for removing particulate from an air stream comprising fan means, a centrifugal separator having an air exhaust, duct means connected to said centrifugal separator and to said fan means for guiding an air stream to said fan means and then to said centrifugal separator, variable fluid injection means in communication with said duct means for injecting a liquid in the air stream flowing through said duct means detecting means for monitoring the quantity of particulate moving in the air stream and coupled to said variable fluid injection means, said variable fluid injection means being responsive to said detecting means and operative to vary the fluid injected into the air stream, and to porportion the quantity of fluid injected in response to the quantity of particulate moving in the air stream.

16. The apparatus of claim 15 and wherein said detection means comprises an opacity monitor.

17. The apparatus of claim 15 and wherein said detecting means comprises an opacity monitor positioned in said duct upstream of said variable fluid injection means.

18. The apparatus of claim 15 and wherein said detecting means comprises an opacity monitor positioned at the air exhaust of said centrifugal separator and arranged to monitor the opacity of the air exhausted from said centrifugal separator.

* * * * *